United States Patent

Mourot

[11] Patent Number: 5,815,533
[45] Date of Patent: Sep. 29, 1998

[54] RECEIVE PROCESSOR DEVICE FOR USE IN A DIGITAL MOBILE RADIO SYSTEMS

[75] Inventor: Christophe Mourot, Asnieres, France

[73] Assignee: Alcatel Mobile Communication France, Paris, France

[21] Appl. No.: 416,975

[22] Filed: Apr. 5, 1995

[30] Foreign Application Priority Data

Apr. 11, 1994 [FR] France .................................. 94 04230

[51] Int. Cl.⁶ ............................ H03K 9/00; H04L 27/06; H04L 27/14; H04L 27/22
[52] U.S. Cl. .......................... 375/316; 375/340; 375/229
[58] Field of Search .................................. 375/346, 349, 375/350, 351, 229, 232, 233, 227, 230, 316, 340; 371/6, 224; 455/135, 277.2, 283, 287, 296; 364/724.2; 328/162

[56] References Cited

U.S. PATENT DOCUMENTS

| | | | |
|---|---|---|---|
| 4,928,288 | 5/1990 | D'Aria et al. ...................... | 375/351 X |
| 5,159,282 | 10/1992 | Serizawa et al. ...................... | 329/326 |
| 5,195,106 | 3/1993 | Kazecki et al. .......................... | 375/230 |
| 5,333,148 | 7/1994 | Tsubaki et al. ...................... | 375/340 X |
| 5,363,411 | 11/1994 | Furuya et al. ...................... | 375/229 X |

FOREIGN PATENT DOCUMENTS

0415897A1  7/1990  European Pat. Off. .

OTHER PUBLICATIONS

*Patent Abstracts of Japan*, vol. 17, No. 642 (E–1466) 29 Nov. 1993 & JP–A–05 207 076 (NEC) 13 Aug. 1993.

*Primary Examiner*—Tesfaldet Bocure
*Assistant Examiner*—Bryan Webster
*Attorney, Agent, or Firm*—Sughrue, Mion, Zinn, Macpeak & Seas, PLLC

[57] ABSTRACT

A receive processor device, in particular for a digital mobile radio system, includes a processor system comprising a set of functional units connected in cascade, some of which are decision units adapted to make decisions as to the value of information symbols that they receive. The decision unit is bypassed in the processor system and the value of information symbols to be processed by the next unit is deleted if the transmission quality of information symbols received by a decision unit is poor. Probable values for the deleted information symbols are determined from deleted information symbols and from undeleted information symbols received by the next unit.

15 Claims, 2 Drawing Sheets

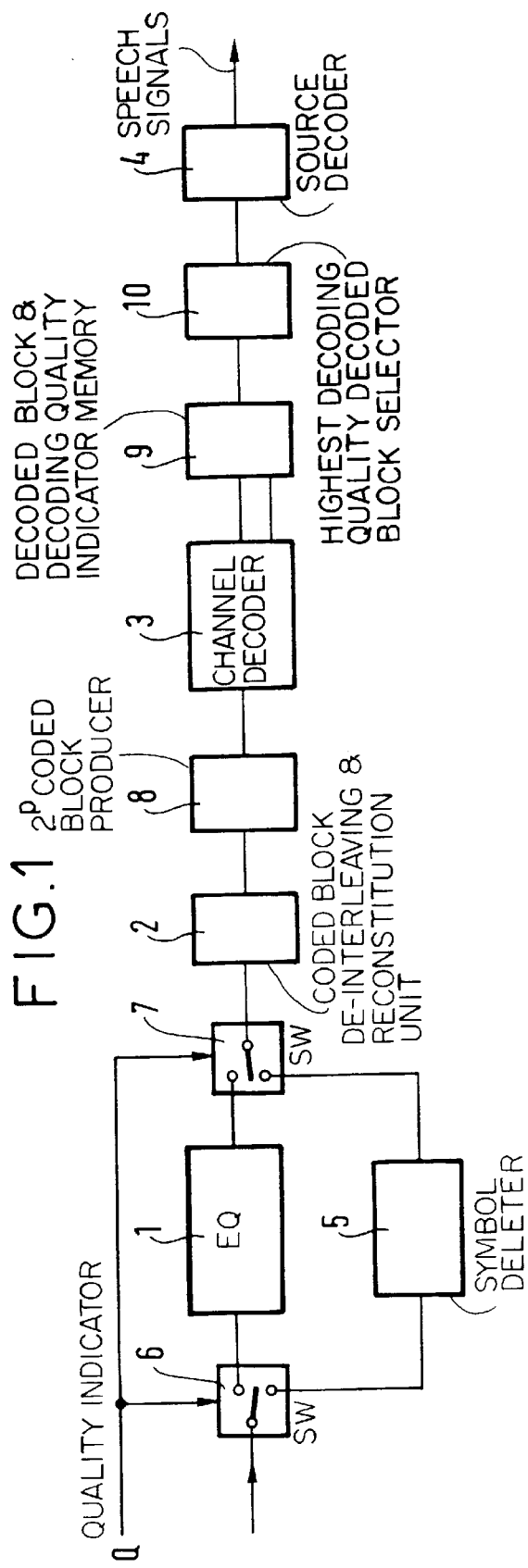
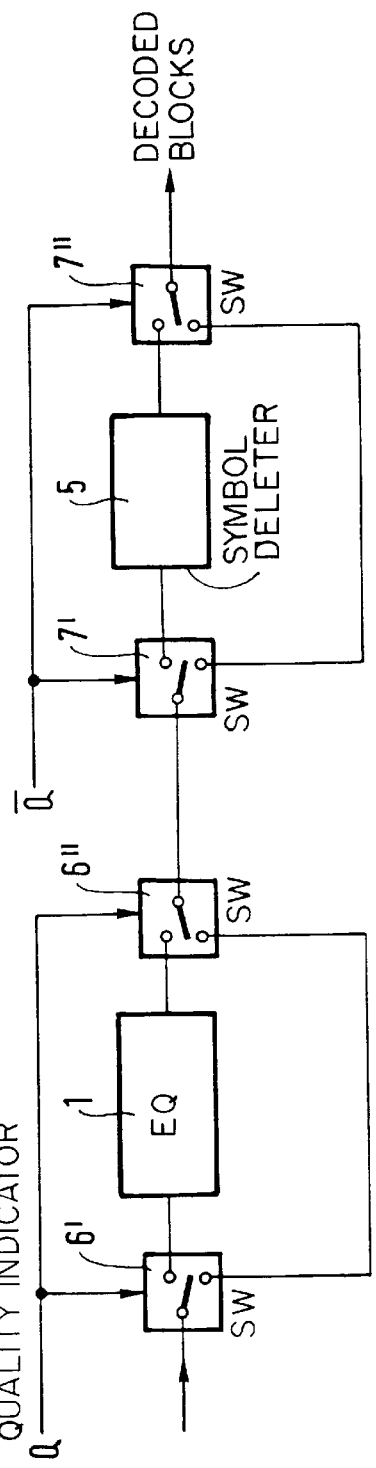

RECEIVE PROCESSOR DEVICE FOR USE IN A DIGITAL MOBILE RADIO SYSTEMS

BACKGROUND OF THE INVENTION

1. Field of the Invention

The present invention concerns a receive processor device for digital telecommunication systems, in particular for digital mobile radio systems.

2. Description of the Prior Art

A processor device of this kind can be generally defined as a device comprising a processor system formed of a set of functional units connected in cascade. Some of these functional units, referred to herein as decision units, are adapted to make decisions as to the value of information symbols that they receive, using processing procedures adapted to minimize the risk of decision errors due to various forms of distortion and/or interference introduced by the transmission channel.

One example of a decision unit of this kind is an equalizer for making decisions as to the value of symbols received using a processing procedure more particularly adapted to minimize the risk of errors due to intersymbol interference.

Another example of a decision unit is a channel decoder making decisions in respect of information symbols output by the equalizer using one or more error protection techniques, operating in association with a corresponding channel coder at the transmitter.

The decision units of a receive processor device of this kind are usually activated at all times, regardless of the quality of the transmission channel.

However, document EP-A-0 415 897 discloses activation of the equalizer only if the quality of the transmission channels is good, the aim here being to reduce power consumption by the receiving terminal.

One object of the present invention is to reduce power consumption by the receiving terminal when transmission quality is poor (in the present context, the expression "transmission quality" is to be understood in a more general sense as the transmission quality of the symbols received by a decision unit, this transmission quality being the same thing as the quality of the transmission channel when the decision unit is the equalizer, for example).

Another object of the present invention is to improve the decision quality of the receive processor device as a whole, and thereby to improve the quality of service for the user, when transmission quality is poor.

SUMMARY OF THE INVENTION

The present invention consists in a receive processor device, in particular for a digital mobile radio system, including:

a processor system comprising a set of functional units connected in cascade, some of which units are decision units adapted to make decisions as to the value of information symbols that they receive, means for bypassing said decision unit in said processor system and for deleting the value of information symbols to be processed by the next unit if the transmission quality of information symbols received by a decision unit is poor, and means for determining from deleted information symbols and from undeleted information symbols received by said next unit probable values for the deleted information symbols.

Other objects and features of the present invention will emerge from the following description of embodiments of the invention given with reference to the appended drawings.

BRIEF DESCRIPTION OF THE DRAWINGS

FIG. 1 is a schematic showing a first application of a device of the invention.

FIG. 2 shows a variant of the FIG. 1 schematic.

FIG. 3 is a schematic showing a second application of a device of the invention.

FIG. 4 is a schematic showing a third application of a device of the invention.

DETAILED DESCRIPTION OF THE PREFERRED EMBODIMENTS

For simplicity, components shown in more than one figure are always identified by the same reference number.

The following description is more particularly concerned with application of the present invention to a digital mobile radio system of the GSM (Global System for Mobile Communications) type. In a system of this kind, the digital information transmitted is obtained by execution of the following operations in succession when the signals to be transmitted are speech signals:

source coding of the speech signals to be transmitted to reduce the natural redundancy of the speech signals and producing entities referred to as blocks of symbols, application of channel coding to these blocks of symbols using a concatenation of several codes, the external code (applied first) being in this instance an error detecting code and the internal code (applied last) being in this instance a convolutional error correcting code, the channel coding producing coded blocks, and interleaving the coded blocks obtained in this way.

The coded and interleaved blocks are then divided into sub-blocks which are multiplexed with other information including a learning sequence to constitute transmission entities called packets. The packets are placed into time slots of a time-division multiplex allocated to them for a given call by the system.

The processor device shown in FIG. 1 includes an equalizer 1 supplying equalized symbols in a known manner from symbols it receives and an estimate of the impulse response of the transmission channel (in turn derived from said learning sequence).

This processor device also includes coded block de-interleaving and reconstitution means 2 which reconstitute coded blocks in a known manner from the symbols of several sub-blocks supplied by the equalizer for several successive packets.

This processor device also includes channel decoder means 3 operating in a known way on the coded blocks supplied by the means 2 in the order opposite to that used for coding at the transmitter.

This processor device also includes source decoder means 4 receiving the decoded blocks from the channel decoder means and reconstituting speech signals from these decoded blocks.

The processor device of the invention shown in FIG. 1 applies in particular to the situation in which the decision unit that can be bypassed in the processor system in the event of poor transmission quality of the symbols that it receives is the equalizer.

This processor device therefore further includes:

means which, in the event of poor transmission quality of the symbols received by the equalizer (i.e. in this example in the case of poor transmission channel quality), bypass the equalizer in said processor system and delete the value of the information symbols to be processed by the next unit (in this example by the coded block de-interleaving and reconstitution means 2), and means for determining, from undeleted information symbols and from deleted information symbols, probable values of the deleted information symbols, these latter means exploiting the error correcting capability of the channel decoder means in this embodiment of the invention (see below).

There are various ways to assess the quality of the transmission channel, for example:

measuring the temporal dispersion on the basis of the estimated impulse response of the transmission channel, or measuring the bit error rate, or measuring the signal/noise ratio, or measuring the signal/interference ratio, or a combination of these measurements.

In the embodiment of the invention shown in FIG. 1 the means 5 for deleting the value of information symbols are connected in parallel with the equalizer 1 and first and second switches 6 and 7 controlled in accordance with the quality Q of the transmission channel to bypass in the processor system either the equalizer 1 if this quality is poor or the delete means 5 otherwise.

A feasible alternative (shown in FIG. 2) is to have the delete means 5 in series with the equalizer and to provide first and second series of switches 6'–6" and 7'–7", one controlled according to the quality Q of the transmission channel and the other according to the complement $\overline{Q}$ of the quality of the transmission channel, and respectively bypassing in the processor system the equalizer 1 if the transmission channel quality is poor or the delete means 5 otherwise.

One option is for the equalizer 1 to supply for each symbol received an equalized symbol having a logic level equal to one of n "meaningful" logic levels for representing the digital information transmitted by the symbol. The following description concerns the use of two logic levels corresponding to the binary values 0 and 1 (i.e. to the situation in which n=2).

In this example, said delete means 5 include means for replacing the logic level of a symbol with a non-meaningful logic level that can be recognized as such by the coded block de-interleaving and reconstitution means 2.

Because of the de-interleaving effected by the means 2, undeleted information symbols can be interleaved with deleted information symbols, in which case the processing carried out by the means for determining probable values for deleted information symbols may be facilitated.

The device shown in FIG. 1 further includes means 8 for establishing, from a coded block including p deleted symbols from the means 2, a succession of $2^p$ coded words or blocks each including, in place of the p deleted or non-meaningful values, one of $2^p$ combination of meaningful values that can be formed for p values, and for applying these $2^p$ coded blocks in succession to the input of the channel decoder means 3.

For each of the coded blocks they receive, the channel decoder means 3 supply, in addition to a decoded block, a block decoding quality indicator (this is symbolized in FIG. 1 by the two lines on the output side of the means 3). In the present example in which the external code (the code applied last on decoding) is an error detector code, a decoding quality indictor of this kind could be an indicator relating to the number of errors detected by the external decoder (i.e. the final decoder stage) of the channel decoder means.

The processor device shown in FIG. 1 further includes means 9 for memorizing the decoded blocks and the corresponding decoding quality indicators supplied in succession by the channel decoder means 3 for the $2^p$ coded blocks supplied to them.

The processor device shown in FIG. 1 further includes means 10 for selecting the decoded block stored in the means 9 for which the decoding quality (as indicated by the corresponding decoding quality indicator) is the best, this decoded block being then supplied to the source decoder means 4.

Another option is for the equalizer 1 to supply for each symbol received, in addition to one of the possible values of that symbol, an equalization quality indicator or confidence indicator as described in the case of an equalizer using the Viterbi algorithm in the document "A Viterbi Algorithm with Soft-Decision Outputs"—J. Hagenauer, P. Hoeher—Proceedings of the IEEE—GLOB'COM 89—Dallas, Tex.—November 89—p 47.1.1 through 47.1.7, for example.

If the possible values are 0 and 1, for example, the combination of a value and its confidence indicator can be a decimal value between –7 and +7, the value –7 indicating a definite 0 and the value +7 indicating a definite 1.

In the present example the delete means 5 can then comprise means for replacing an information symbol supplied to them with a value corresponding in decimal to the value 0.

In this example the means for producing the various possible combinations of symbols from a coded block including p deleted symbols can, in the general case, generate $q\times 2^p$ such combinations, where q is the number of possible values of a confidence indicator.

To simplify the processing this number can be reduced to $2\times 2^p$, for example, by considering only the values –1 and +1 (in the present numerical example), rather than all the values from –7 through +7.

In the embodiment shown in FIG. 1, the means 8, 9 and 10 form in conjunction with the channel decoder means said means for determining from deleted symbols and from undeleted symbols probable values for the deleted symbols.

The means 8, 9 and 10 may not be needed if the correction capability of the error correct code used is sufficient to enable probable values to be determined for the deleted symbols, in which case said means for determining from deleted symbols and from undeleted symbols probable values for the deleted symbols consist in the channel decoder means themselves. In the case of channel decoder means using a Viterbi algorithm, one way of dealing with a deleted symbol is to ignore it in the metric calculation carried out for the coded word including the deleted symbol.

Figures 3, 4:
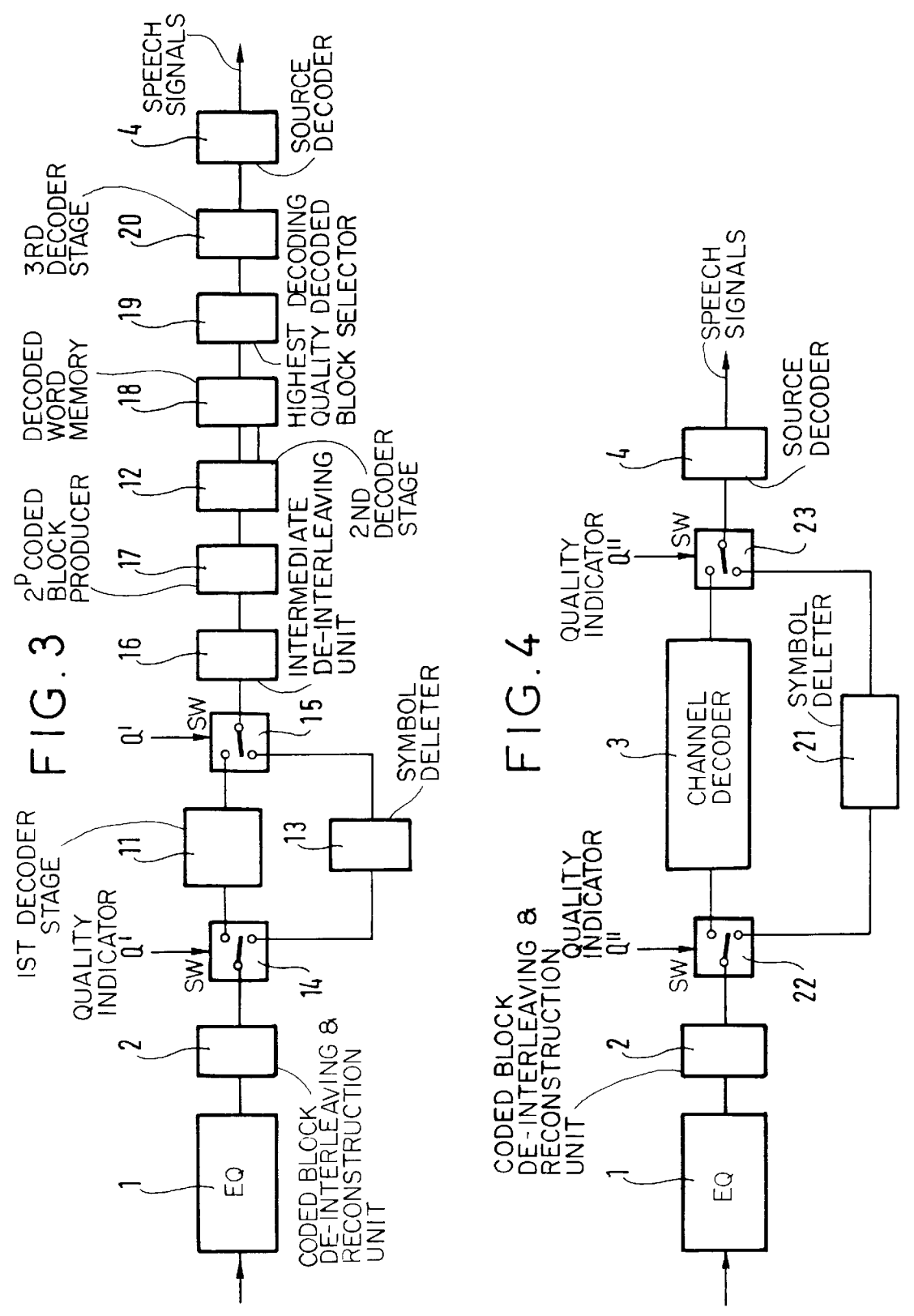

FIG. 3 shows application of the invention to the situation in which the decision unit which can be bypassed in the processor system if received symbol transmission quality is poor is made up of the first stage 11 of the channel decoder means 3. In the present example of transmission of speech signals in the GSM system, this first stage uses a convolutional error corrector code.

The transmission quality Q' can be indicated by a decision quality indicator in respect of decisions taken by the equalizer. In the case of an equalizer using the Viterbi algorithm, for example, this indicator can be obtained by averaging confidence indicators obtained in the manner described in the prior art document cited above. In the case of a decoder stage 11 using a Viterbi algorithm, the transmission quality could instead be determined at the output of the decoder stage, from the final metric value of the "survivor" path determined by this algorithm.

The device shown in FIG. 3 includes:

means for bypassing the first stage 11 of the channel decoder means in the processor system if the quality Q' is poor and for deleting the symbols to be supplied to the next unit which, in this example of speech transmission in the GSM system, is a second stage 12 of the channel decoder means using a block error corrector code, and means for determining from deleted symbols and from undeleted symbols probable values of the deleted symbols.

The bypass, delete and deleted symbol probable value determining means can be similar to those described with reference to FIGS. 1 and 2, the means for determining probable values for deleted symbols using in this example, as in the previously described example, the correction capability of an error corrector code, in this case the error corrector code employed by the second decoder stage.

FIG. 3 shows:

delete means 13, two switches 14 and 15 controlled by the transmission quality Q' for bypassing either the decoder stage 11 or the delete means 13 in the processor system, depending on the transmission quality Q', intermediate de-interleaving means 16 (this assumes the existence at the transmitter of intermediate interleaving being the two coding stages corresponding to the first and second decoding stages), means 17 for generating $2^p$ coded words to be supplied to the second decoder stage 12, where p is the number of symbols deleted in a coded word from the first stage 11 by the delete means 13, means 18 for memorizing decoded words supplied in succession by the decoded stage 12 for these $2^p$ coded words and the corresponding decoding quality (this is symbolized in FIG. 3 by two lines on the output side of the decoder stage 12), and means 19 for selecting the decoded word for which the decoding quality is best, this decoded word being in this example supplied to a third decoder stage 20 of the channel decoder which in this example of speech transmission in the GSM system uses an error detector code.

If the delete means 13 use, as described above, confidence indicators supplied by the decision unit in question (in this instance the first decoder stage 11), the confidence indicators can be obtained as described in prior art documents cited above, for example, if the first stage uses the Viterbi algorithm.

The means 17, 18 and 19 and also the intermediate de-interleaving means 16 and the corresponding intermediate interleaving means at the transmitter may not be needed if the correction capability of the error corrector code used, here by the second decoder stage, is sufficient.

In the case of decoder means with a plurality of stages, the invention is not limited to the situation shown in FIG. 3 in which the decision unit that can be bypassed in the processing system is the first such stage. Nor is it limited to three stages, as in the example of application to speech transmission in the GSM system.

FIG. 4 shows application of the invention to the situation in which the decision unit which can be bypassed in the processing system if received symbol transmission quality is poor if the channel decoder means 3.

The transmission quality Q" can be indicated by a decision quality indicator in respect of decisions taken by the channel decoder means. In the example of speech transmission in the GSM system, in which said external code is an error detector code, this quality indicator can be an indicator relating to the number of errors detected by the external decoder (i.e. the final decoder stage) of the channel decoder means.

The device shown in FIG. 4 includes:

means for bypassing the channel decoder means 3 in the processing system if the quality Q" is poor and for deleting the symbols to be supplied to the next unit, in this example the source decoder means 4, and means for determining from deleted symbols and from undeleted symbols probable values for the deleted symbols.

The bypass and delete means can be similar to those described with reference to the previous figures.

FIG. 4 shows:

delete means 21, and two switches 22 and 23 controlled by the transmission quality Q" and for bypassing either the channel decoder means 3 or the delete means 21 in the processor system, according to the transmission quality Q".

The means for determining probable values for the deleted symbols here exploit the inherent redundancy of the signals to be transmitted and can comprise means for interpolating blocks of symbols supplied to the source decoder means, for example as described in GSM Recommendation 6.11 "Substitution and muting of lost frames for full-rate speech traffic channels".

Note that in either of the application examples given, the bypass means are advantageously deactivated to reduce the power consumption of the receiving terminals.

When the transmission quality in question is not poor, additional means can advantageously:

bypass in the processor system both the decision unit in question and the delete means if the transmission quality is good, and bypass the delete means but not the decision unit in question in the processor system if the quality is average.

In the embodiment of the invention shown in FIG. 2, for example, these additional means simply consist in appropriate control means for the switches 6', 6", 7', 7" conditioned by the transmission quality in question.

The transmission quality: good, average or poor, can be assessed in a simple way by comparing the transmission quality to first and second thresholds, the quality being good if it is higher than the higher of the thresholds, average if it is between the two thresholds, and poor if it is below the lower threshold.

Although the above description has been given in the specific case of application of the present invention to a GSM type mobile radio system, the invention is not limited to this type of application.

There is claimed:

1. A receive processor device for use in a digital mobile radio system, the device including:

a processor chain comprising a set of units connected in cascade, one or more of said units being decision units, each of said decision units making decisions as to the value of information symbols received by said each decision unit;

means for bypassing one of said decision units and for deleting the value of information symbols to be processed by a succeeding unit connected in cascade with said one of said decision units, if the transmission quality of information symbols received by said one of said decision units is poor; and means for determining probable values for information symbols deleted by said means for bypassing, based on said deleted information symbols and based on information symbols not deleted by said means for bypassing.

2. The receive processor device according to claim 1 wherein said one of said decision units is an equalizer.

3. The receive processor device according to claim 1 wherein said one of said decision units comprises a channel decoder.

4. The receive processor device according to claim 1 wherein said one of said decision units is one decoder stage of a channel decoder means which includes a plurality of stages each using one of a plurality of concatenated codes used at a transmitter from which said information signals originate.

5. The receive processor device according to claim 1 wherein said means for bypassing is connected in parallel with said one of said decision units by means of two switches;

whereby said one of said decision units is bypassed if said transmission quality is poor, or said means for bypassing is bypassed otherwise.

6. A receive processor device for use in a digital mobile radio system, the device including:

a processor chain comprising a set of units connected in cascade, one or more of said units being decision units, each of said decision units making decisions as to the value of information symbols received by that decision unit;

means for bypassing one of said decision units if the transmission quality of information symbols received by said decision unit is poor;

means for deleting the value of information symbols to be processed by a succeeding unit connected in cascade with said one of said decision units if the transmission quality of information symbols received by said one of said decision units is poor, said means for deleting being connected in series with said decision unit;

means for determining probable values for information symbols deleted by said means for deleting, based on said deleted information symbols and based on information symbols not deleted by said means for deleting; and means for bypassing said means for deleting, if said transmission quality is not poor.

7. The receive processor device according to claim 1 wherein said one of said decision units supplies, for each information symbol received, one of a plurality of meaningful logic levels for representing the digital information transmitted by said each information symbol, and wherein said means for bypassing includes means for replacing an information symbol with a non-meaningful logic level recognizable as such by said succeeding unit.

8. The receive processor device according to claim 1 wherein said one of said decision units is adapted to supply, for each symbol received, a decision quality indicator corresponding to the decision made by that decision unit, and wherein said means for bypassing includes means for replacing an information symbol with a decision quality indicator that indicates poor decision quality.

9. The receive processor device according to claim 2 wherein said succeeding unit is a decision unit comprising a channel decoder means, and wherein said means for determining probable values for information symbols deleted by said means for bypassing includes:

means for producing, from a coded word comprising a plurality of deleted symbols, a set of coded words applied in succession to said channel decoder means, said coded words corresponding to various possible combinations of symbols for said plurality of deleted symbols, means for memorizing, for each of said coded words, the corresponding decoded word output by the channel decoder means and a corresponding decoding quality indicator, and means for selecting the memorized decoded words for which the decoding quality indicator indicates the best decoding quality.

10. The receive processor device according to claim 2 wherein said succeeding functional unit is a channel decoder means and, wherein said means for determining probable values comprises said channel decoder means.

11. The receive processor device according to claim 4 wherein said succeeding unit is a decision unit comprising a subsequent decoder stage of said channel decoder means, and wherein said means for determining probable values for deleted symbols includes:

means for producing, from a coded word comprising a plurality of deleted symbols, a set of coded words applied in succession to said next decoder stage, said coded words corresponding to different combinations of symbols for said plurality of deleted symbols, means for memorizing, for each of said coded words, the corresponding decoded word output by said next decoder stage and a corresponding decoding quality indicator, and means for selecting the memorized decoded words for which the decoding quality indicator indicates the best decoding quality.

12. The receive processor device according to claim 4 wherein said succeeding unit is a decision unit comprising a subsequent decoder stage of said channel decoder means, and wherein said means for determining probable values comprises said subsequent decoder stage.

13. The receive processor device according to claim 3 wherein said succeeding unit is a decision unit comprising a source decoder means, and wherein said means for determining probable values comprises means for interpolating blocks of symbols supplied to said source decoder means.

14. A receive processor device for use in a digital mobile radio system, the device including:

a processor chain comprising a set of units connected in cascade, one or more of said units being decision units, each of said decision units making decisions as to the value of information symbols received by that decision unit;

means for bypassing one of said decision units if the transmission quality of information symbols received by said one of said decision units is poor;

means for deleting the value of information symbols to be processed by a succeeding unit connected in cascade with said one of said decision units if the transmission quality of information symbols received by said one of said decision units is poor;

means for determining probable values for information symbols deleted by said means for deleting, based on said deleted information symbols and based on information symbols not deleted by said means for deleting; and means for bypassing said one of said decision units if said transmission quality of information symbols received by said one of said decision units is good and for not bypassing said one of said decision units if said transmission quality of information symbols is average.

15. The receive processor device according to claim 1 further including means for deactivating said one of said decision units when it has been bypassed.

* * * * *